(12) United States Patent
Ross (10) Patent No.: US 6,209,493 B1
(45) Date of Patent: Apr. 3, 2001

(54) INTERNAL COMBUSTION ENGINE KIT WITH ELECTROLYSIS CELL

(75) Inventor: Bill Ross, Newmarket (CA)

(73) Assignee: Global Tech Environmental Products Inc., Aurora (CA)

( * ) Notice: Subject to any disclaimer, the term of this patent is extended or adjusted under 35 U.S.C. 154(b) by 0 days.

(21) Appl. No.: 09/361,138

(22) Filed: Jul. 27, 1999

(51) Int. Cl.⁷ .................................................... F02B 43/08
(52) U.S. Cl. ............................ 123/3; 204/242; 204/267; 205/688; 123/DIG. 12
(58) Field of Search ................................ 123/DIG. 12, 3

(56) References Cited

U.S. PATENT DOCUMENTS

| | | | |
|---|---|---|---|
| 3,939,806 | * | 2/1976 | Bradley ...................................... 123/3 |
| 4,085,709 | * | 4/1978 | Tangri ..................................... 123/1 A |
| 4,090,485 | * | 5/1978 | La Creta .................................. 123/133 |
| 4,271,793 | * | 6/1981 | Valdespino ................................. 123/3 |
| 4,368,696 | * | 1/1983 | Reinhardt ................................... 123/3 |
| 4,369,737 | | 1/1983 | Sanders et al. ............................ 123/3 |
| 4,620,915 | | 11/1986 | Öhlin ....................................... 204/284 |
| 5,082,544 | * | 1/1992 | Willey et al. ............................ 204/270 |
| 5,105,773 | | 4/1992 | Cunningham et al. ..................... 123/3 |
| 5,119,768 | * | 6/1992 | Russell .................................. 123/1 A |
| 5,143,025 | | 9/1992 | Munday ...................................... 123/3 |
| 5,231,954 | | 8/1993 | Stowe ......................................... 123/3 |
| 5,452,688 | | 9/1995 | Rose .......................................... 123/3 |
| 5,711,865 | * | 1/1998 | Caesar ..................................... 205/628 |

FOREIGN PATENT DOCUMENTS 2141880  3/1993 (CA).

\* cited by examiner

*Primary Examiner*—Tony M. Argenbright
*Assistant Examiner*—Katrina B. Harris
(74) *Attorney, Agent, or Firm*—Piasetzki & Nenniger (57) ABSTRACT

An electrolysis cell and internal combustion engine kit including an electrolysis cell is disclosed. The cell includes a sealed plastic body having an inlet and an outlet. The plastic body includes a first terminal located at the top of the body, a second terminal located adjacent to the first terminal and insulated conductors associated with each terminal extending through the body and towards the bottom end thereof. Each terminal ends in a respective anode and cathode which are operatively connected to the terminals. The anode and cathode are spaced apart from one another within the body. When an electrolysis solution is placed in the body, and a current provided across the electrodes, water is caused to decompose into hydrogen and oxygen. These combustible gases are then passed into the internal combustion engine to increase the efficiency and power thereof. In one embodiment a reservoir is provided to ensure that the level is maintained in the cell. Safety features include a low level sensor switch and low level shut off, a temperature sensor and high temperature cut off, and a pressure sensor and high pressure cut off.

10 Claims, 8 Drawing Sheets

INTERNAL COMBUSTION ENGINE KIT WITH ELECTROLYSIS CELL

FIELD OF THE INVENTION

This invention relates to the general field of combustion engines, and more particularly, to combustion engines of the type that use conventional hydrocarbon fuels such as gasoline or diesel fuel, natural gas and propane in combination with fuel additives such as hydrogen and oxygen. Most particularly, this invention relates to an electrolysis cell capable of producing hydrogen and oxygen for use in an internal combustion engine as a fuel additive for improving performance and reducing pollution from the internal combustion engine.

BACKGROUND OF THE INVENTION

Modern gasoline and diesel engines are much more efficient and less polluting than similar engines of even a few years ago. However, due to the increased number of vehicles in use, levels of air pollution continue to rise even in light of more efficient and clean running vehicles. Therefore, there has been increasing pressure to develop vehicles which have lower emissions, and thus are less polluting than conventional automotive technology permits.

For example, under certain government "Clean Air" legislation, a certain number of vehicles are required to be emission free. This legislation has put pressure on OEM's to develop alternate fuel technologies including electric cars and vans, natural gas and propane fuelled vehicles, hydrogen cell vehicles and the like. While a number of these technologies are promising, some are still a long way from commercial implementation, and others appear to have reached the limit of present design capabilities without yielding a consumer acceptable product. Therefore, attention has refocused on conventional gas and diesel burning engines, to try to develop a more pollution free and efficient combustion system.

In the past, it has been discovered that the use of hydrogen and oxygen as a fuel additive increases the efficiency of an internal combustion engine and reduces pollution considerably. Both advantages appear to be the byproduct of faster flame speed that is as much as 9 times that of gasoline, resulting in more complete combustion of the fuel in the combustion chamber, with the resultant reduction in soot (semi-burnt hydrocarbons) and other pollutants such as nitrous oxide, carbon monoxide, and an increase in output energy for a greater fuel efficiency and horsepower.

U.S. Pat. No. 5,231,954, which issued on Aug. 3, 1993, teaches an electrolysis cell for use in connection with a combustion engine for generating hydrogen and oxygen gases which are added to the fuel delivery system as a supplement to the gasoline or other hydrocarbons burned therein. While this patent proposes an electrolysis unit which is relatively simple and easy to install, this prior device has a number of problems which require considerable maintenance and lead to higher costs associated with installing and using the device.

This patent teaches a low concentration of electrolyte, by weight, which is created by pre-mixing and pre-charging a concentrate for 24 hours. This results in a higher resistance electrolysis cell which can be connected directly to a conventional vehicle battery. In the context of consumer applications, it is too awkward to do this pre-charging and mixing. In addition, since the resistance of the solution is relatively high, a high amount of heat is created in the cell during use, which can be problematic.

The preferred form of the electrolysis chamber taught by this patent is a plastic walled chamber, into which the terminals are sealed. The terminals project from the lower side of the plastic shell of the electrolysis cell itself.

The unit comes on when the motor is turned on and the cell, and in particular the terminals, tend to heat up considerably. Under the continual heating and cooling cycling the seals around terminals can crack leading to a loss of seal integrity and leaks. This requires more frequent replenishment of the electrolyte, and a loss of function. In addition, the electrodes of this prior device extend about two thirds to three quarters of the way to the top of the device. Thus, there is not much free board of solution above the top of the electrode which is disadvantageous. After only a short period of operation, parts of the electrodes become exposed, creating a need for addition of distilled water. This requires frequent replenishment of the fluid, which is awkward and time consuming. Further there is always a risk, when the electrodes are exposed, of a spark causing an explosion of the highly combustible gases in the unit.

In addition, the patent teaches that the gases produced in the electrolysis chamber be introduced directly into the PVC vacuum line used for circulating crank case gases to the intake manifold so that oxygen and hydrogen generated in the electrolysis cell are withdrawn by the vacuum effect in the vacuum line.

This has been found to be problematic. The introduction of the gases into the PVC vacuum line creates considerable problems for modem engines. Such engines typically include sensors for monitoring input air quality (the so called "MAP" or mass air pressure sensors) which provide output to a microprocessor which can for example adjust the fuel input to the engine accordingly. Additional sensors monitor the combustion outputs. Introducing these additional gases into the PVC means that they are put in downstream of the MAP sensors which creates an imbalance, fooling the microprocessor and causing the engine to misfire and behave poorly. Thus, in some cases, introduction of the gases creates a worse polluting engine. Considerable adjustment of the microprocessor controller is required to make resolve this issue, which increases installation and servicing costs.

SUMMARY OF THE INVENTION

What is required is a simple and inexpensive system which overcomes the problems associated with the prior art devices. Most particularly, this system should include a sealed chamber, to prevent the electrolytic solution from being lost to effects other than electrolysis. In addition, the device should include electrodes which are located well beneath the surface of the electrolytic solution, to allow the electrolytic solution to be used up without exposing the electrodes. Further the system should include an automatic shut off switch to cause the unit to stop in the event the liquid level gets low enough to expose the electrodes. In addition, most preferably the device will conduct electrolysis in a low resistance electrolysis fluid, permitting it to operate at relatively low temperatures to prevent damaging heating and cooling cycles which can impair seal integrity. As well the device should have any joints or openings in the sealed chamberformed above the highest liquid level in the chamber. In this manner, even if a leak develops, the leak will simply allow additional air into the electrolysis chamber rather than leaking out electrolytic solution. Lastly, the system should preferably compensate for loss of liquid water to decomposition to prevent over concentration of the solution, which can lead to a higher resistance cell and excessive heat generation.

Accordingly, there is provided an electrolysis cell according to the present invention comprising:
a sealed plastic body;
an outlet vent on the body;
an inlet vent on the body;
a first terminal located at a top of said body;
a second terminal located adjacent to said first terminal;
an insulated conductor associated with each terminal extending through said body and towards a bottom end thereof;
an anode operatively connected to one of said terminals; and
a cathode associated with the other of said terminals, said anode and said cathode being spaced apart from one another within said body.

BRIEF DESCRIPTION OF THE DRAWINGS

Reference will now be made, by way of example only, to preferred embodiments of the invention as illustrated in the attached figures.

DETAILED DESCRIPTION OF THE PREFERRED EMBODIMENTS

Figure 1:
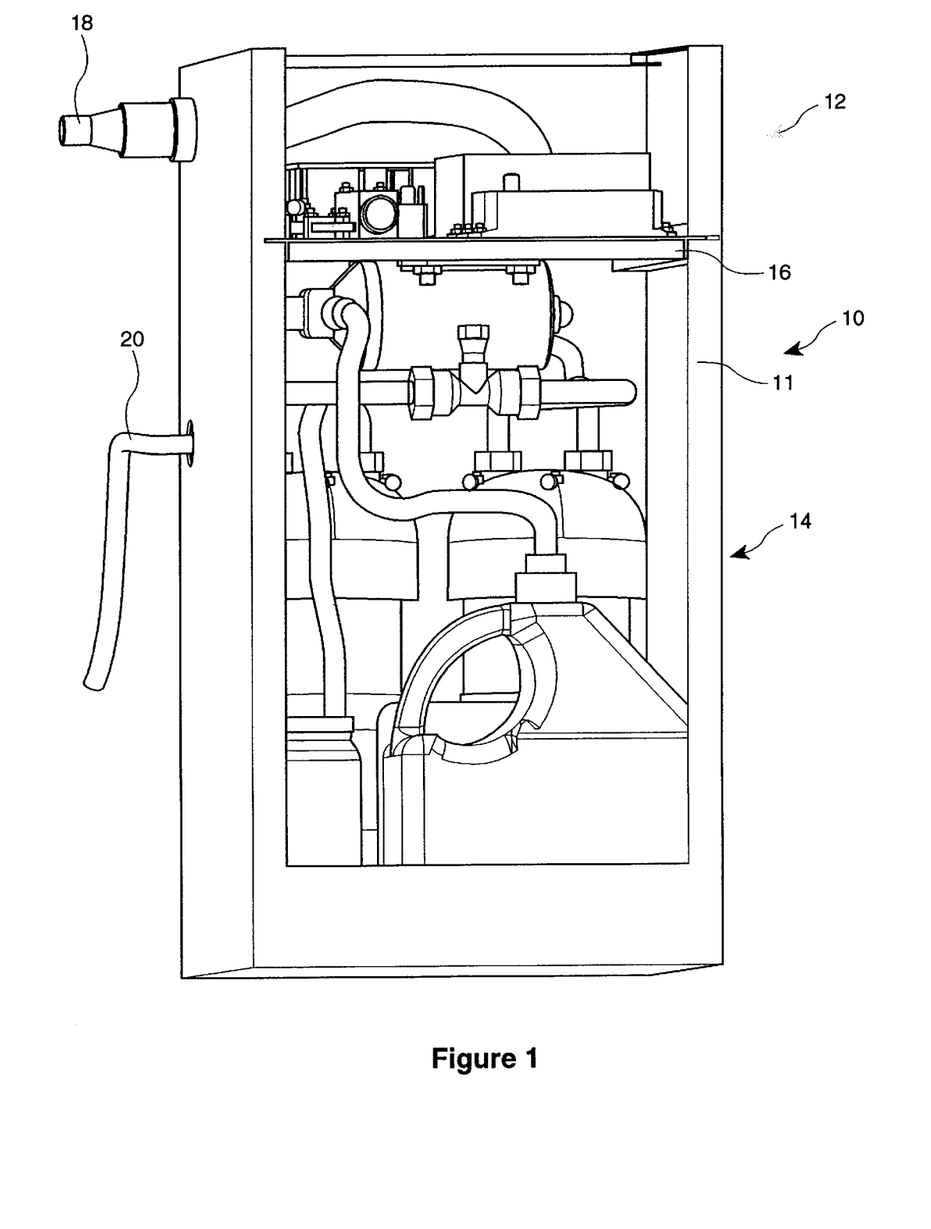
FIG. 1 is a perspective view of a kit of components, including an electrical section and a fluid section, assembled according to the present invention.

FIG. 1 shows a perspective view of a kit of components for providing combustion products to an internal combustion engine. The assembled kit is generally indicated with reference numeral 10, and comprises an electrical section 12, shown on top, for mostly electrical components, and a fluid section 14, shown on bottom, for mostly electrolysis and fluid handling components, all housed in a box enclosure 11. An internal shelf 16 divides the two sections and supports the electrical section 12. It can be appreciated that other configurations of the assembled kit of components are possible, in addition to the rectangular box shown, as long as they fulfill the function of housing the kit of components in a convenient enclosure.

FIG. 1 illustrates that the present invention may be viewed as a "black box" with two outer connections. One connection is a wiring harness 18, which carries a bundle of electrical wire and cable. A second connection is output hose 20, which carries generated hydrogen and oxygen gas to a vehicle internal combustion engine, not shown. For greater clarity, it may be noted that the preferred embodiment of the present invention also includes an operator panel and oil pressure switch that are located external to the box enclosure 11. These elements are discussed further below. The dimensions of the preferred embodiment of the box enclosure 11 are about 12 inches by 12 inches by 24 inches. This size is small enough to permit the assembled kit 10 to be conveniently attached, as an add-on, to one or more locations in or on a typical commercial vehicle. In a large tractor-trailer type vehicle, with an engine size of about 7–15 liters, the box enclosure 11 may be conveniently attached to the bracket that holds the fuel tanks, outside the engine compartment. In that case the output hose 20 will be run to the engine air intake. In some cases, this distance will be about 15 feet.

Figure 2:
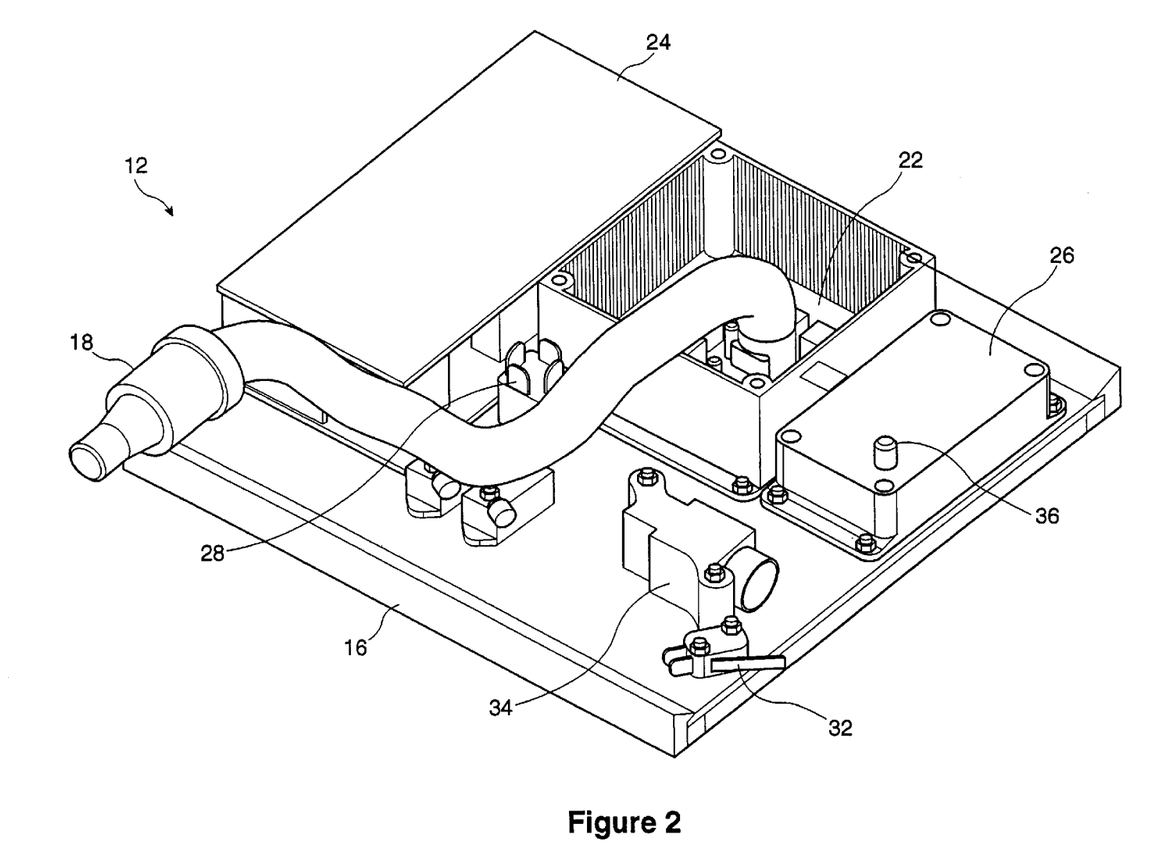
FIG. 2 is a perspective view of the electrical section of FIG. 1.

FIG. 2 is a detailed view of the elements of the electrical section 12, resting on the base or shelf 16. The wiring harness 18 carries electrical power and communication signals into and out of the assembled kit 10. Included among the electrical components mounted on the shelf 16 are a C.P.U. 22, cell power supply 24, auto-refill electronics circuit 26, and relay 28.

The C.P.U. 22 may be any common programmable control device, such as a microprocessor or programmable logic controller (PLC). In the preferred embodiment of the invention, a PLC is preferred because of its low cost and relatively simple and embedded programming scheme. The PLC is typically a single chip device with a plurality of pins, most of which connect with one of the various switches, sensors, or display units that comprise some of the components of the assembled kit 10, as further discussed below.

Among the electrical signals carried in the wiring harness 18 is an input power line from the vehicle battery. This line supplies power to the C.P.U. and other digital electronic devices, and also to the cell power supply 24. The cell power supply 24 is a passive device that contains a power conditioning means in the form of a DC-DC converter to power the electrolysis process. This direct current (DC) output is at a reduced voltage and stepped-up current from the input vehicle battery power, and typically maintains a current on the order of 23–26 amps. The relay 28 opens or closes the connection between the vehicle battery and the cell power supply 24, under the control of the C.P.U. When the connection is open the cell power supply 24 is disabled and the electrolysis process is shut down. The auto-refill electronics circuit 26 is a separate circuit maintained in its own housing in the preferred embodiment. It can be appreciated however that this circuitry could be incorporated into the C.P.U. 22 if desired.

The electrical section 12 also includes a number of switches and sensors, including a temperature sensor 30, cover switch 32, inertia switch 34, and manual refill switch 36. The temperature sensor may be a simple thermistor, and in the preferred embodiment is set to activate upon the ambient temperature in the electrical section 12 rising above about 80 degrees Celsius. The box enclosure 11 also includes a removable cover, not shown, to permit access to the components of the assembled kit 10. The cover switch 32 opens if the cover is not attached or improperly closed. The inertia switch 34 responds with an open signal if the spatial orientation of the assembled kit 10 is disturbed. This could occur, for example, if the vehicle experiences a collision or other accident. The manual refill switch 36 acts to bypass the auto-refill electronics circuit 26, so that the refill function performed by the circuit may be provided, upon manual intervention, in the event of a failure by the circuit. The temperature sensor 30, cover switch 32, and inertia switch 34 connect with the C.P.U. so that, upon activation by any one of them, the C.P.U. is notified and can take appropriate action, generally consisting of shutting down the device.

Figure 3A:
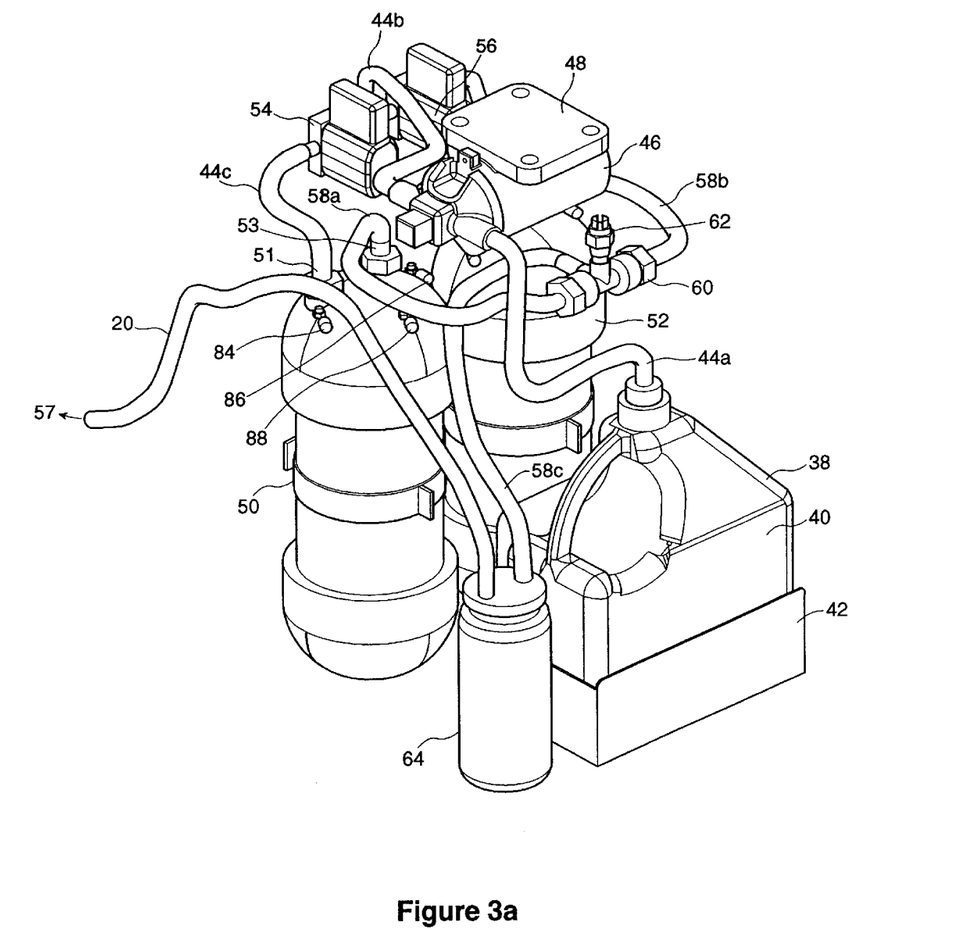
FIG. 3a is a perspective view of the fluid section of FIG. 1.
Figure 3B:
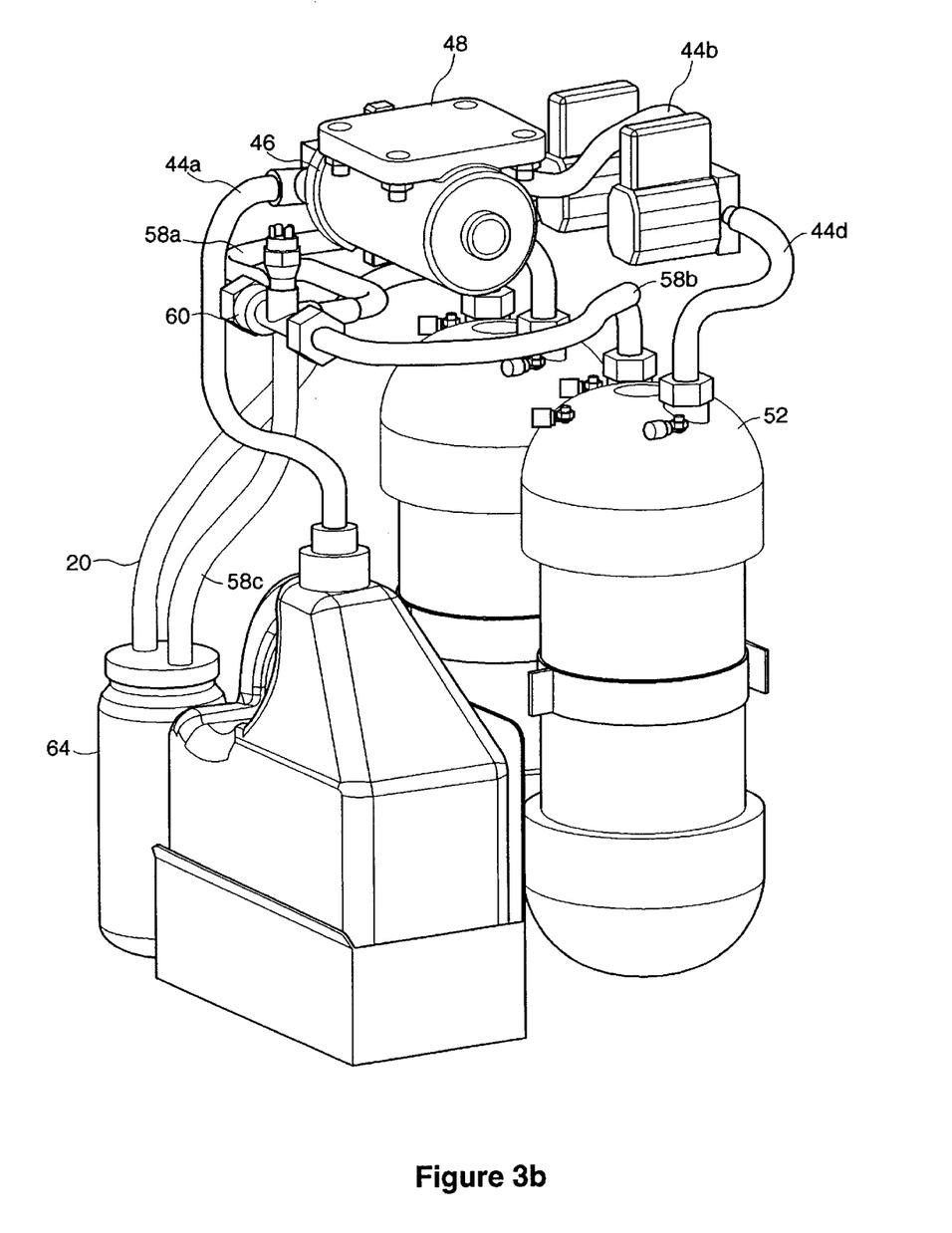
FIG. 3b is the same view as FIG. 3a, shown at a different angle.

The components of the fluid section 14 are shown in FIGS. 3a and 3b. These figures both show the same elements from different perspectives. Generally, the fluid section 14 of FIGS. 3a and 3b describes two paths: a water flow path and a gas flow path.

A starting point for the water flow path is water reservoir 38, which contains a reservoir of distilled water 40. The reservoir 38 is held in place by a water jug bracket 42. A water hose connects the water reservoir to a fill pump 46 through a first section, designated 44a. The fill pump 46 mounts just below the shelf 16 through an attached mounting bracket or plate 48. The water hose continues beyond the fill pump through a second section 44b to a T-section, not visible in the drawings, that splits the water hose into two further sections, designated as 44c and 44d. Water hose section 44c connects with a first electrolysis cell 50 and, as seen in FIG. 3b, water hose section 44d connects with a second electrolysis cell 52. These connections are made through a water inlet 51 on each cell. A pair of solenoids, designated as solenoid 54 and solenoid 56 respectively, are located on either side of the T-section. Each solenoid attaches to a separate gate and acts independent of the other so that, when the solenoid is in a closed position, the path is blocked through water hose section 44c and/or 44d, as the case may be. The entry of water hose sections 44c and 44d into cells 50 and 52, respectively, marks the other end point for the water flow path in the fluid section 14.

Cells 50 and 52 are sealed chambers preferably constructed out of a lightweight, heat resistant material. In the preferred embodiment a PVC based plastic is used. Also in the preferred embodiment two cells are used to provide better flexibility and capacity in meeting the combustion needs of large commercial vehicles. However it can be appreciated that a smaller apparatus using only one cell may also be constructed, and may be advantageously used with smaller vehicles such as automobiles. The cells in the preferred embodiment are generally cylindrical and are approximately 13 inches high, with a diameter of approximately 4 inches. The output capacity of a cell is directly related to its volume, so in general a larger cell may be preferred. However, since it is also desired to minimize the size of the overall assembled kit 10 to ease installation, there is an opposing preference to keep the cell size small. It is a particular advantage of the present invention that, while keeping the cell size relatively small, it is nonetheless able to produce a useful amount of combustible gas. The discussion further below concerning the design of the internal components of the cells provides further information on how this beneficial effect is achieved. There are also 4 electrical terminals on each cell representing a cathode terminal 84, anode terminal 86, low level indicator terminal 88 and high level indicator terminal 90. Not all of these are visible in the drawings, which are marked as appropriate.

The flow path of gas 57 through fluid section 14 may be described as follows. In one embodiment of the present invention, each of cells 50 and 52 have a gas hose 6 designated 58a and 58b respectively, emanating from a gas outlet 53 located on each cell. Gas hoses 58a and 58b then attach to opposing ends of a T-section 60. A pressure sensor 62 is located at the central junction of the T-section 60. The pressure sensor 62 is of a conventional type, and is set to activate upon a pressure setting of approximately 6 psi. The gas may be optionally routed from the boost side of the vehicle turbocharger, in which case the pressure sensor would preferably be set to activate in a range of approximately 20–30 psi. The gas hose continues out of the T-section 60 as a single hose designated as gas hose 58c, and connects at its other end to a moisture trap 64. Finally, the gas flow path continues out of the moisture trap through output gas hose 20.

There is a second, preferred embodiment of the gas flow path that is not directly illustrated in the drawings but that may be readily described. In this embodiment there is no gas hose 58a, T-Section 60, or gas hose 58c. Rather, the moisture trap 64 sits directly on top of the gas output of cell 50, at gas outlet 53. Gas hose 58b, emanating from the other cell, attaches near the top and side of moisture trap 64. As there is no T-Section in this embodiment, the pressure sensor 62 would be attached to the side wall of the moisture trap. Output gas hose 20 extends from the moisture trap 64 to the engine as before. The advantages of this embodiment relate to improved efficiency in moisture capture and disposal, and are discussed below in the section relating to the design of the moisture trap. Finally, it may be noted that where only one cell is used, the first embodiment is preferred, with the pressure sensor attached to the moisture trap as in the second embodiment.

As noted above, there is an oil pressure switch 66 that is not shown as part of the assembled kit 10 or in any of the drawings. This switch is an off-the-shelf switch that is easily installed on the vehicle engine by inserting it in place of a non-functional oil gallery plug. The oil pressure switch 66 will generally activate upon the presence of any oil pressure, such as occurs upon engine start-up.

Figure 4:
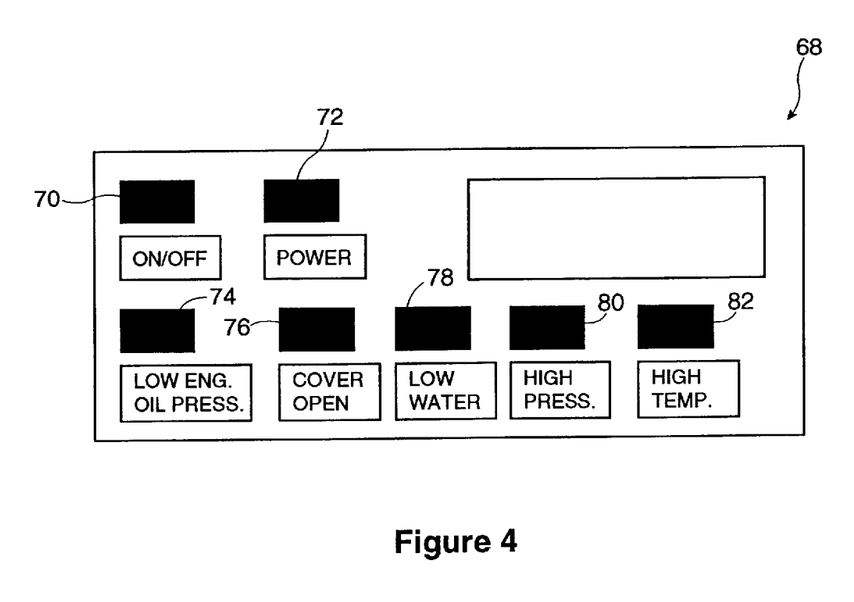
FIG. 4 shows the operator panel.

Also as noted, there is an operator panel that installs in the driver cabin. This is shown generally as 68 in FIG. 4. The operator panel has an on/off switch 70 and a corresponding power l.e.d. (light emitting diode) 72. There are also five l.e.d.'s which light up when their corresponding sensors are active. These are: low engine oil pressure l.e.d. 74, which corresponds with oil pressure switch 66, cover open l.e.d. 76, which corresponds with cover switch 32, low water l.e.d. 78, which corresponds with a sensor to be discussed below, high pressure l.e.d. 80, which corresponds with pressure a sensor 62, and high temperature l.e.d. 80 which corresponds with temperature sensor 30.

The overall system operation of the assembled kit 10 may now be described, referring to FIGS. 2, 3a, 3b, and 4.

The system is enabled by the operator, who is generally the driver of the vehicle, pressing the on/off switch 70 on the control panel. In the ordinary course this informs the C.P.U. 22 to close the relay connecting the vehicle battery input to the cell power supply 24, and alerts the operator through the power l.e.d. 72, which lights up. The system however will not start if any of the switches or sensors are activated. In particular, the engine must be running, so that the oil pressure switch detects any level of oil pressure. The cover to the box enclosure 11 must be properly closed, or there will be a disabling signal from the cover switch 32. The other sensors must also be satisfied, but are less likely to be a problem on start-up. Electrolysis is the well known technique whereby current is passed through liquid, causing it to decompose. Where the liquid is water it can be caused to decompose to hydrogen and oxygen. When the present invention is in operation, the cathode terminal 84 and anode terminal 86 of each cell receives the high current DC input from the cell power supply 24. The electrolysis process commences in each cell, and generated hydrogen and oxygen gas exits the gas hoses 58a and 58b, or, as described, exits from cell 50 directly into the moisture trap 64. Gas pressure is monitored by the pressure sensor 62, which alerts the C.P.U. if the pressure rises above a pre-set level, generally about 6 psi, or 20–30 psi if routed from a turbocharger.

The presence of the pressure sensor guards against a condition such as a kink or obstruction in the gas hose, which could raise the pressure to a dangerously high level. If the C.P.U. receives a high pressure signal, it will light up the high pressure l.e.d. 80 on the operator panel and also trigger the relay 28 to turn off power to the cells, stopping the electrolysis.

The generated gas generally retains some moisture as a residue of the electrolysis process. The presence of moisture is undesirable as it acts to undermine combustion efficiency. Accordingly, the generated gas is run through the moisture trap 64 so that moisture is removed from the gas before it enters the output gas hose 20. It is preferred that most moisture is removed, and the present unit provides adequate results. Other configurations are also possible which may remove more or less moisture, but removing less moisture might negatively affect performance of the assembled kit. In the preferred embodiment, the moisture trap 64 is made from a PVC based plastic, and is in the shape of a cylinder, about 3 inches high and 1 inch inside diameter. The internal operation of the moisture trap is discussed in greater detail below.

As will be discussed, it is possible to configure the cells so that the hydrogen and oxygen gases are separated at production. The hydrogen gas may be directed to the vehicle engine, and the oxygen either allowed to escape or re-directed as desired. One reason to pursue this course would be to avoid confusing the MAP sensors present in many vehicles, particularly passenger cars. These sensors monitor and adjust the fuel/air combination to optimize combustion efficiency. Adding oxygen through electrolysis without properly accounting for it can lead to increased pollution and reduced combustion efficiency.

As a response, the output gas from the output gas hose 20 may be preferably introduced into the engine ahead of the MAP sensors, for example at the air intake filter. In this way, the MAP sensors will be able to detect and compensate for the extra input oxygen, so that an efficient combustion can be maintained. This avoids the problems of unbalanced readings, and removes the need to substantially revise the microprocessor combustion controls on most vehicles. Thus, rather than removing the oxygen, this embodiment relies on introducing the gases upstream of the sensors to avoid the problems of the prior art.

As will be shown, the electrolysis process depends on there being an electrolytic solution inside the cells. The electrolytic solution has a substantial water component which is used up by the electrolytic process. As the water is used up, the liquid level of solution declines and needs to be replenished. In other systems, itwould be necessaryforthe operatorto stop the vehicle and manually refill the cells. This is inconvenient and inefficient, and also raises the risk that the operator may inadvertently cause damage to the device. The present invention avoids these problems by including a refill process that operates automatically and in the background. It is therefore an advantage of the present invention that it extends the length of time during which the electrolysis cells can operate without service by the operator.

As will be shown in greater detail below, when the level of liquid reaches a pre-deternined low level, a signal is sent from the cell to the C.P.U. Similar to the high pressure situation described above, the C.P.U. generates a signal that activates the low water l.e.d. 78 on the operator panel, and also sends a signal to the relay that disconnects the cell power supply, shutting off the electrolytic process. Then, through the auto-refill electronics 26, the C.P.U. signals the fill pump 46 to begin pumping water out of the water reservoir 38. The C.P.U. also signals either one or both of the solenoids 54 and 56 to open their respective gates, so that the pumped water can flow into either or both of cells 50 and 52, as the case may be. The refilling continues until the level in the cell reaches a predetermined high level, at which point a signal is sent from the cell to the C.P.U. The C.P.U. then signals the appropriate solenoid to shut its gate so that no further water is permitted to enter the cell. The C.P.U. will also signal the fill pump to stop, unless it is still waiting to receive a high signal from the other cell, in which case it will stop the other solenoid and the fill pump when the second high signal is received. At that point, the C.P.U. will turn off the low water l.e.d. on the operator panel, and the system will resume as before. If the cell cannot be refilled, as for example, if the water reservoir 38 is low, a high level signal will not be received and the system will remain shut down.

In the preferred embodiment with cell sizes as noted, the entire refill process takes approximately one minute. During this time the operator may possibly experience a slight loss in power, but in most cases will likely not notice any performance related effect at all. In this way, it can be seen that the electrolysis cell and assembled kit of the present invention maintain a continuous flow of combustible gas to the vehicle engine, enhancing its performance. The presence of various sensors and switches keep the system operating safely, so that combustible gas is not being produced when the engine is off, the vehicle is jarred in an accident, the cover is not properly closed, pressure builds up in the gas hose, or when the temperature has risen to a high level.

Figure 5:
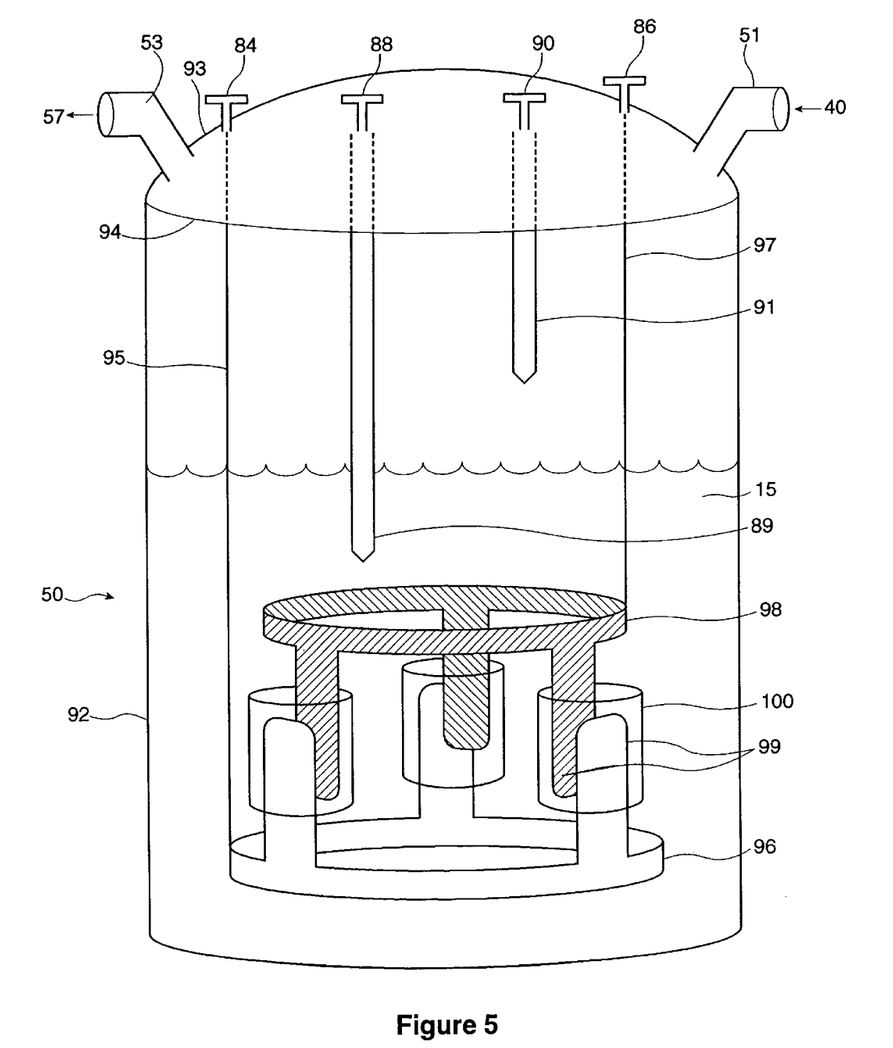
FIG. 5 is an overview of the elements of the electrolysis cell.

The configuration and operation of the electrolysis cells and moisture trap may now be described in greater detail. The broad elements of the electrolysis cell are shown in FIG 5. The cell 50 comprises a body 92 and lid 93, joined at a sealed rim where the body meets the lid. There are six input/output ports or terminals on the lid. The water inlet 51 receives water from the water hose 44*c*. The combustible gas exits the cell through the gas outlet 53, either to gas hose 58*a* or directly to the moisture trap 64. The cathode terminal 84 and anode terminal 86 receive high current DC power from the cell power supply 24, to drive the electrolysis process. A low level terminal indicator 88 and high level terminal indicator 90 are electrical terminals that connect to pins on the C.P.U., to alert the C.P.U. to a condition of low fluid level and high fluid level respectively.

The interior of the cell 50 may now be viewed. There is an electrolyte solution 15 that fills the interior up to a particular level. This solution is composed of an electrolyte in solution with water. Although many different electrolytes may be used, good results have been achieved with distilled water and potassium hydroxide. The potassium hydroxide acts as an electrolyte, in a known manner, to lower the resistance of the water and to improve the performance of the electrolytic cell. An operating range of potassium hydroxide to water is about 15% to 45% by weight, with a preferred range being 25–35%, and 30% being the most preferred ratio. As is known in the art, at this level the resistance of the solution is the lowest, meaning that a minimum amount of heat is generated during electrolysis. Other electrolytes may also be used such as $HNO_3$, $H_2SO_4$, $CrO_3$ and the like. Notwithstanding the low resistance however the production of hydrogen and oxygen is sufficient for the beneficial effects in combustion. In addition, the concentration of potassium hydroxide noted will prevent the solution from freezing up to a temperature of about minus 70 degrees C.

The low and high level indicator terminals connect to a low level indicator rod 89 and high level indicator rod 91, respectively, inside the cell. The rods are made from 316L stainless steel, and descend vertically from the lid. The low level indicator rod 89 is longer, and therefore descends farther, than the high level indicator rod 91. The fluid level will always be somewhere between the tip of the low level indicator rod 89 on the low end, and the tip of the high level indicator rod 91 on the high end.

The cathode terminal 84 connects to an outer electrode conductor rod 95 which is a vertical rod that descends substantially into the cell. Similarly the anode terminal 86 connects to an inner electrode conductor rod 97 that descends somewhat less substantially into the cell. The conductor rods are made most preferably from stainless steel. Grade 316L stainless steel has found to yield suitable results, but other conductor material may also be suitable. Not shown on the drawing is that both conductor rods are surrounded end to end by insulation, so there is no short circuiting or electrical or electrolysis interaction between the rods and the surrounding solution. It has been found that conventional shrink wrap plastic is suitable for forming an insulation layer around the conductor rods.

Each conductor rod terminates in an electrode, preferably formed in a ring. The outer electrode conductor rod 95 terminates in an outer electrode 96, and the inner electrode conductor rod 97 terminates in an inner electrode 98. The electrodes, being extensions of the conductor rods, are constructed of the same stainless steel and are exposed to the surrounding solution. Each electrode also contains a plurality of projecting tab extensions or fingers 99 that project in a perpendicular plane. The inner electrode 98 is of smaller diameter than the outer electrode 96. The electrodes are arranged so that a finger from the inner electrode 98 is aligned with and inside of a corresponding finger on the outer electrode 96. Each such electrode pair is itself surrounded by an isolator 100. The isolators 100 act as an electrical insulator. In the preferred embodiment the isolators are tube shaped and open at each end. The isolators are generally made of standard PVC plastic tubing, about 3 inches high and 1 inch inside diameter. The preferred embodiment also uses six fingers on each electrode, enclosed as six pairs within six isolators. FIG. 5 shows only three fingers on each electrode, and three finger pairs, for clarity in visualizing the relationship between the elements.

In the preferred embodiment of FIG. 5 the cathode terminal is associated with the larger diameter outer electrode 96 and the anode terminal is associated with the smaller diameter inner electrode 98. This assignment is arbitrary and may be reversed without reservation. The preferred embodiment also shows that the fingers 99 descend downward from the inner electrode 98, but are reversed and project upwards from the outer electrode 96. Again, this assignment is arbitrary in that the outer electrode 96 could have fingers 99 that descend and the inner electrode 98 could have fingers that rise. Similarly, both electrodes could have fingers that are oriented in the same direction. It can be appreciated as well that other arrangements may be used instead of ring shaped electrodes. The key requirement is that each of the anode and cathode maintain some sort of broad surface area, with edges, in close proximity to each other so that electrolysis can proceed efficiently.

Figure 6:
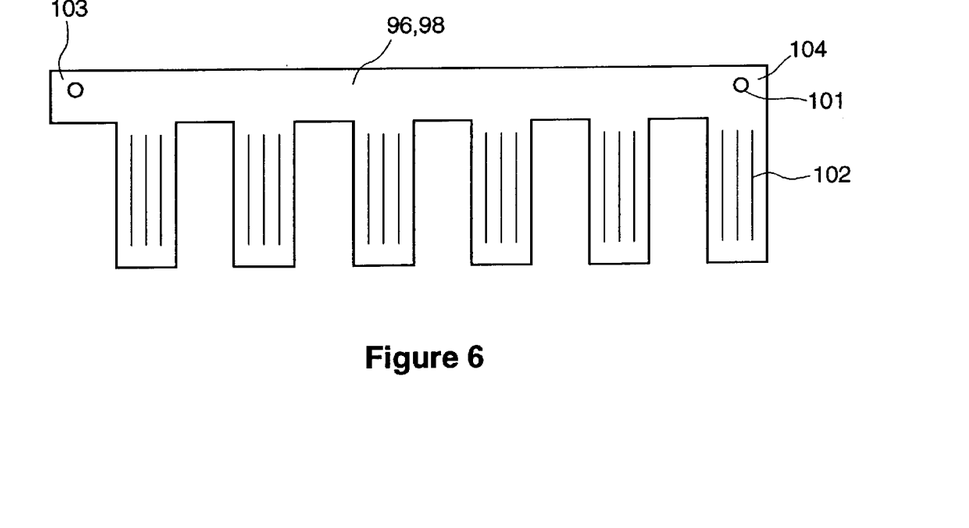
FIG. 6 is a schematic view of the electrode according to the present invention.

Notwithstanding the above comments, there is some benefit to retaining the ring shaped electrode and finger arrangement shown in the preferred embodiment of FIG. 5. By arranging for the two rings to have fingers projecting in opposite directions, and by using a tube shaped isolator which is open at both ends, the electrodes and isolators can be kept in position easier. The isolators will be unable to slip out since they will be blocked at either end by an electrode. Not shown in the drawing are tie strings that can be looped around the electrodes and fingers to hold the elements in place. In the preferred embodiment, one tie string is tied horizontally, making contact with the isolators, and two tie strings are tied in a vertical loop, making contact with the two electrodes. Maintaining these elements in a tight connection is advantageous because once the lid is sealed it is not possible to open the cell to repair or reinforce a loose electrode. FIG. 6 shows an electrode 96 or 98 stretched out flat. It will be appreciated that the ends 103, 104 are joined, by any conventional means such as a spot weld 101, to form a circular loop. This loop is then secured by solder, welding, or the like to the ends of the conductor rods 95, 97. Satisfactory results have been achieved with fingers of about 3½ inches high, $30/1000$ inches thick, and ¾ inches wide. Other dimensions will also provide reasonable results, provided that a sufficient surface area of the electrodes 96, 98 is provided. It is reasonably important for smooth operation of the device to ensure that the electrodes are evenly spaced apart. Therefore, it is preferred to use at least a few spacers, not shown, in between the electrodes 96 and 98 to make sure that there is an even annular gap.

FIG. 6 also show that the fingers each have three grooves 102. The grooves are cut completely through the fingers 99 so that two new edges are formed on each side of the finger, for each groove. Because of the nature of the electrochemical reaction, gas bubbles tend to form on the edges of the plates. Therefore, forming a plate with a plurality of edges, such as the grooves 102 as shown, is believed to enhance the production of hydrogen and oxygen gas in the cell.

Figure 7:
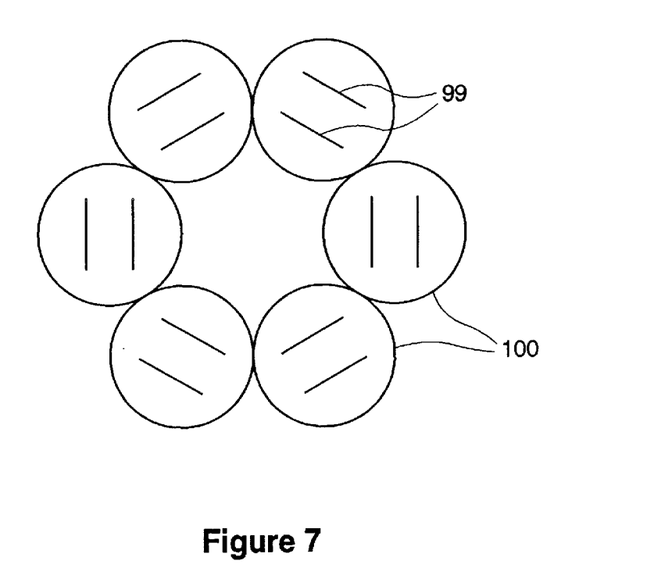
FIG. 7 is a plan view of the anode and cathode fingers, enclosed by tube-shaped isolators.

For further clarity, FIG. 7 provides a plan view of the isolators and the cathode/anode finger pairs, viewed on edge.

An advantage of the above configuration of the cell of the present invention is that all of the terminals are placed on the top lid, while the electrolyte solution cannot rise above a predetermined maximum set below the top lid. Unlike the prior art, where the terminals project from the side of the cell, there is never any contact between the fluid and the terminals. This avoids the problem of loss of seal integrity and leaks that can occur when, as a result of continual heating and cooling of fluid the seals are caused to crack.

The operation of the electrolysis cell can now be described. With reference to FIG. 5, the electrolyte solution 15 will be at a level somewhere between the lower tip of low level indicator rod 89 and the lower tip of high level indicator rod 91. The high current DC power is applied across the cathode and anode terminals 84 and 86. The electrical charges are applied to the two electrodes, causing electrical current to flow across the gap between each cathode finger and its adjacent anode finger. The electrical current flows through the electrolyte in a conventional manner, causing the electrolysis reaction to take place, i.e. the decomposition of water into hydrogen and oxygen. The hydrogen and oxygen gas form bubbles which rise to the surface of the fluid, continue rising in the unfilled space above, and exit the gas outlet 53. The electrolysis process is enhanced by concentrating the effect in finger pairs, with extensive edge producing grooves, and by enclosing each such pair with an isolator. The isolator has the effect of minimizing inefficient electrical contact between non-adjacent finger pairs. As a consequence, this configuration and design of the present invention has the advantageous effect of reducing heat, so that more of the energy input is directed to the desired electrolysis.

As the electrolysis proceeds the fluid level will decline as water is decomposed. The potassium hydroxide electrolyte does not get used up in the reaction, and therefore does not need to be added in the usual case. However, the result is that as the water decomposes and is lost from the cell, the concentration of potassium hydroxide will increase. Once the concentration passes about 30% by weight, the resistance of the cell increases with increasing concentration of electrolyte. This in turn increases the amount of heat generated, which reduces the efficiency of the electrolysis. Another factor is that the electrodes should always be covered by the solution and should not be exposed. Exposure of the electrodes creates a risk of a spark which, in the environment containing combustible gas, could cause an explosion. In the present invention, as noted the fluid level will always be somewhere between the tip of the low level indicator rod 89 on the low end, and the tip of the high level indicator rod 91 on the high end. It can be predetermined that for fluid levels within this range the concentration of the electrolyte, and corresponding electrolysis efficiency, will be acceptable. Further, as indicated in FIG. 5, the lowest level that the fluid might reach, that of the low level indicator rod 89, can be set well above the electrodes to avoid the risk of electrode exposure. In the preferred embodiment, this distance is about 1½ to 2 inches.

The manner in which the fluid levels are maintained within these bounds is as follows. The low and high level indicator terminals 88 and 90 are driven by a square or alternating wave from the C.P.U. The low level indicator rod 89 will generally have contact with the electrolyte solution at its tip, and thereby will maintain some current flow, which will be sensed by the C.P.U. Conversely, the high level indicator rod 90 will generally not have contact with the electrolyte solution, and thereby will tend to appear as an open circuit to the C.P.U. When the fluid level descends below the tip of the low level indicator rod, thatterminal will suddenly appearopen to the C.P.U., which will inform the C.P.U. that the fluid is at a low level. Similarly, on refill, the high level terminal will suddenly close when the fluid reaches the tip of the high level indicator rod, informing the C.P.U. that the high point has been reached. Once the C.P.U. receives the information, it is straightforward for it to take the steps described earlier, i.e. turn display l.e.d's on or off, or turn the system on or off. A square or alternating wave is used to drive the indicator rods to prevent the current through the rods from becoming a part of the electrolytic process.

In another form of the present invention, the electrolysis process can be configured to separate the hydrogen and oxygen gases. This could be achieved by providing a liquid permeable but gas bubble proof barrier between the inner and outer electrodes. This barrier may be made from woven polypropylene for example. Above the barrier would be located an impermeable cowl, which could be vented by a further nozzle or vent provided on the cell lid 93. It can now be appreciated that this embodiment of the invention comprehends separating produced hydrogen from produced oxygen.

Figure 8:
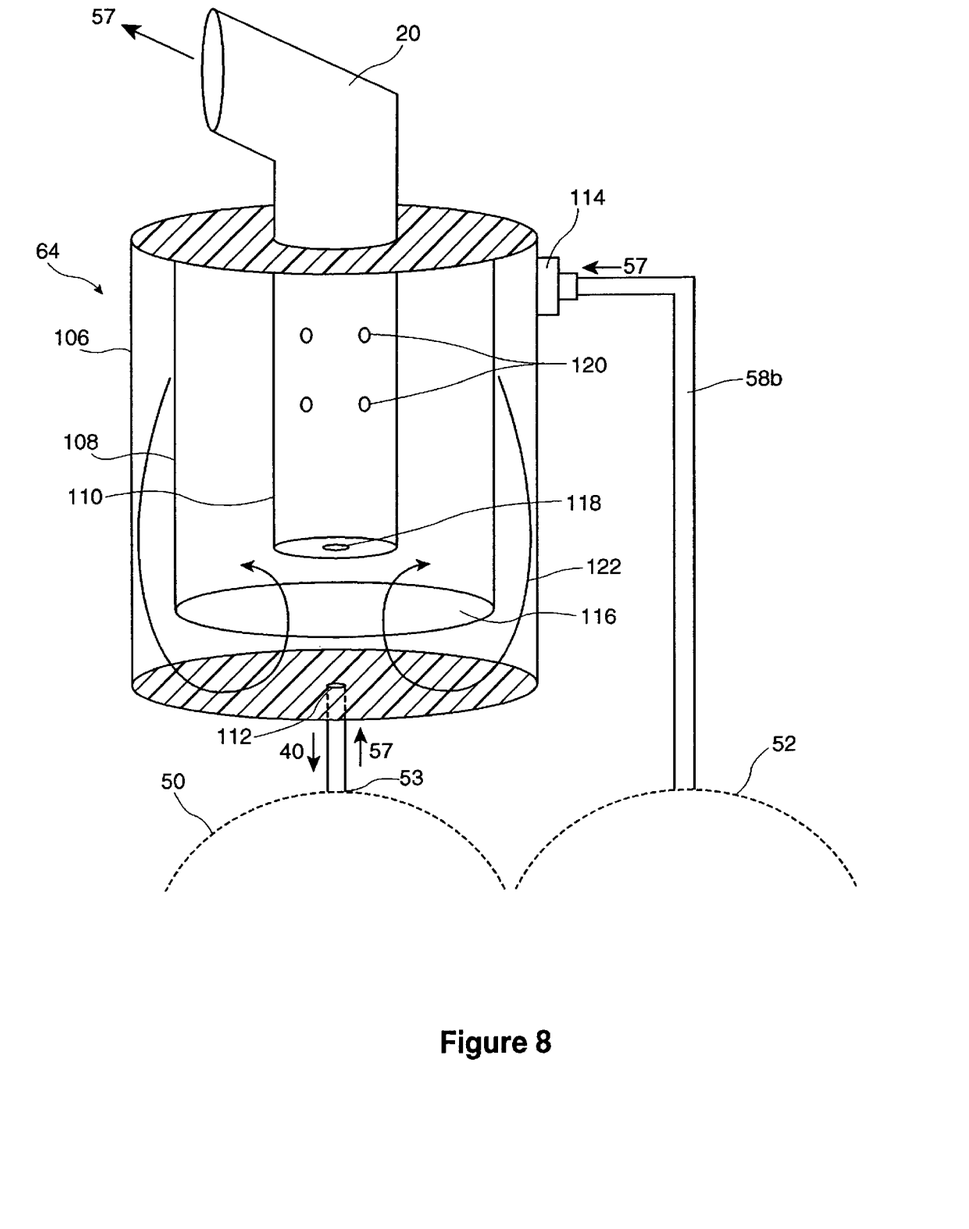
FIG. 8 is an overview of the elements of the moisture trap.

The broad elements of the moisture trap are shown in FIG. 8. In the preferred embodiment described above, the moisture trap sits directly above one of the cells, for example, cell 50, and connects with the gas outlet 53 through a first gas entry 112. In practice, this connection may also include a short section of hose 58a. The moisture trap also connects with the gas output of the second cell, cell 52, through gas hose 58b that connects to second gas entry 114, located on a side wall near the top of the moisture trap 64. Output gas hose 20 emanates from the top of the moisture trap and connects with the vehicle engine air intake.

The moisture trap 64 itself comprises three cylinders. There is a large, outer cylinder 106 that contains the first and second gas entries to receive the gas outputs of the two cells, and that connects with the output gas hose 20. There is a smaller middle cylinder 108 positioned inside outer cylinder 106, and that attaches to the inside top of the outer cylinder. The bottom of middle cylinder 108 is open. Then there is an even smaller inner cylinder 110 positioned inside the middle cylinder 108, that also attaches to the inside top. The inner cylinder 110 is open at the top, coinciding with the top of the moisture trap, and maintains an open connection with the output gas hose 20. The bottom of inner cylinder 110 is a small hole, inner cylinder entry 118. There are additionally a series of small holes, inner cylinder holes 120, located on the side of inner cylinder 110. In the preferred embodiment there are 8 inner cylinder holes 120, formed by drilling four 2 hole pairs through the inner cylinder 110. However it can be appreciated that a different number of inner cylinder holes 120 could also be used.

In the preferred embodiment, the three cylinders are constructed from standard PVC plastic tubing. The outer, middle, and inner cylinder are respectively approximately 3¾, 3½, and 2¾ inches in height, and approximately 2¼, 1 1/16, and ¾ inches in diameter. It can be appreciated that other materials and dimensions may also be used with satisfactory results.

In operation, gas enters the moisture trap at the bottom from cell 50 and at the side near the top from cell 52. The entry of gas at opposing ends, coupled with the internal configuration of the moisture trap, being the various inner and outer walls and holes and openings of the cylinders, combine to produce an air turbulence effect, as represented by air flow 122. The flow of air can be likened to a cyclone, in which airflow follows a circular spin and rises along a central column. The spinning air deposits moisture embedded in the gas on the internal walls of the moisture trap, where it eventually drips to the bottom and exits through first gas entry 112 to cell 50. This is represented by the arrow showing water 40 in FIG. 8. Simultaneously, the rising column of gas proceeds through inner cylinder 110 and exits through output gas hose 20. Due to the function performed by the moisture trap, the exiting gas has a reduced moisture content, which produces an improved combustion in the vehicle engine.

The main benefit of the above embodiment, in which the moisture trap is positioned directly above one of the cells, is that it automatically drains trapped moisture out of the moisture trap and into the cell. In the embodiment shown in FIG. 3 the moisture trap would have to be drained periodically to get rid of the accumulated water. This would also be the case in a single cell system. Another benefit of the above embodiment is that the entry of gas at opposing ends enhances the cyclone effect. Additionally, the return of water to the cell helps to replenish water lost to electrolysis, which reduces some of the demand on the automatic refill system and the water reservoir 38.

When the present invention is operated under cold weather conditions, as noted the presence of electrolyte acts as an antifreeze to prevent the fluid inside the cells from freezing. However, the water 40 in the water reservoir 38 may be vulnerable to freezing, particularly when the vehicle is stopped. One simple solution would be for the driver to remove the reservoir, which is often just a commonly available distilled water jug, when the vehicle is at rest. This solution is facilitated by the mounting of the reservoir or jug in the water jug bracket 42. Another possibility is to put a small amount of electrolyte in the water reservoir. This may require careful monitoring of the level of electrolyte in the cell. To avoid over-concentration, the system could also be designed to constantly cycle fluid from the cell to the reservoir. In that case the fill pump would always be in operation. Yet another possibility would be to cover the water reservoir with a thermal blanket, powered by the vehicle battery. The power requirement for this however is quite large. Finally, another solution would be to mount the cell power supply in close proximity to the water reservoir. The heat of the power supply could be used advantageously to thaw the water in the reservoir, if frozen. Results from installation of the present invention in actual vehicles are provided below.

Example 1

A kit according to the present invention (but without reservoir) was installed on a 1996 Ford Escort having about 130,000 kilometres on the odometer.
Emissions
The following emission results were noted:

| GAS | Reading (Unit Off) | Reading (Unit On) | % Change |
|---|---|---|---|
| | A. At Idle | | |
| $CO_2$ | 15.18 | 14.71 | −3% |
| CO | 0.07 | 0.03 | −57% |
| $O_2$ | 0.07 | 0.10 | +42% |
| HC | 98 | 33 | −66% |
| | B. At 2500 RPM | | |
| $Co_2$ | 15.25 | 14.78 | −3% |
| CO | 0.12 | 0.01 | −92% |
| $O_2$ | −0.02 | −0.05 | — |
| HC | 7 | 3 | −57% |

EXAMPLE 2

This same vehicle was tested for gas mileage. Typically, without the unit, highway mileage was 10.0 kilometers per liter. Results of two trials with the unit in place, and activated, yielded 15.29 kilometers per liter and 17.07 kilometers per liter respectively, and average increase of about 61.8%. This was all highway driving, and with air conditioning on.

EXAMPLE 3

In this example a 1994 Volvo with a 460 Detroit engine was subjected to a series of opacity tests to measure the cleanliness of the exhaust. The tests were conducted using a CalTest™ 1000 Smokemeter, and followed the Society of Automotive Engineers SAE J1667 procedures and standards, which is also the EPA standard for opacity testing.

The results of four tests conducted without the kit according to the present invention installed were:

| | Average Opacity | Range |
|---|---|---|
| 1. | 20.8% | 4.9% |
| 2. | 18.1% | 0.3% |
| 3. | 21.3% | 3.4% |
| 4. | 23.0% | 3.3% |

A kit according to the present invention was then installed in the subject vehicle, and the following seven results were obtained upon repeating the opacity test:

| | Average Opacity | Range |
|---|---|---|
| 1. | 10.3% | 1.8% |
| 2. | 13.3% | 3.2% |
| 3. | 14.0% | 0.9% |
| 4. | 12.4% | 2.4% |
| 5. | 12.7% | 3.2% |
| 6. | 11.8% | 3.9% |
| 7. | 11.9% | 2.1% |

The above results indicate that the average opacity was substantially reduced after the unit was installed.

The most preferred form of the present invention is in the form of an after market add-on kit to an existing automobile. However, it will be appreciated by those skilled in the art that the unit can also be installed by OEM's as a factory installation and achieve the same results. The sealed electrolysis chamber merely needs to be installed under the hood, in the trunk or on the frame of an H.G.V. unit and appropriately connected.

It will be appreciated by those skilled in the art that the foregoing description was in respect of preferred embodiments and that various alterations and modifications are possible within the broad scope of the appended claims without departing from the spirit of the invention such as operating under full vacuum with the necessary modifications. For example, while reference is made to an electrolyte solution made with potassium hydroxide, other forms of electrolyte solutions will also yield reasonable results. Also, while reference was made to the electrodes being made with stainless steel, other materials such as titanium plated with platinum may also be used. Further, a third electrolysis cell may be added, which is activated upon an increase in load to the vehicle engine. Various other modifications will be apparent to those skilled in the art but are not described in any further detail herein.

I claim:

1. An internal combustion engine kit for producing a combustible gas to enhance combustion of an internal combustion engine, the internal combustion engine kit comprising:

at least one electrolysis cell, to produce a combustible gas, said at least one electrolysis cell having a cathode and an anode, wherein said cathode and said anode are in the form of spaced apart rings within said body, each ring having a plurality of fingers extending therefrom. the fingers of the anode being adjacent to the fingers of the cathode to promote electrolysis;

a power conditioning means, to provide appropriate electrical power to said at least one electrolysis cell;

a water reservoir, to provide water to said at least one electrolysis and an electronic controller, for controlling the supply of electrical power to the electrolysis cells, so that the electrolysis cells can perform electrolysis, and for controlling the supply of water from the water reservoir to the electrolysis cells.

2. An internal combustion engine kit according to claim 1, further including a high liquid level sensing means for sensing a high liquid level in said one or more electrolysis cells.

3. An internal combustion engine kit according to claim 1, wherein said combustible gas flowing from said electrolysis cells is connected to a moisture trap.

4. An internal combustion engine kit according to claim 1, further including a temperature sensor for sensing the ambient temperature adjacent to said power conditioning means.

5. An internal combustion engine kit according to claim 1, further including a pressure sensor for sensing the pressure of the combustible gas emanating from the electrolysis cells.

6. An internal combustion engine kit according to claim 1, further including an oil pressure sensor for sensing the pressure of oil in said internal combustion engine.

7. An internal combustion engine kit according to claim 1, wherein said electrolysis cell is housed in an enclosure, the interior of said enclosure being accessible through a removable cover, further including a cover switch for detecting whether the cover is properly closed.

8. An internal combustion engine kit according to claim 1, further including an inertia switch for detecting whether said electrolysis cell is maintained in a proper spatial orientation.

9. An internal combustion engine kit according to claim 4, 5, 6, or 7, wherein upon the activation of any or all of said temperature sensor, pressure sensor, oil pressure sensor, or cover switch, a warning signal is generated for an operator.

10. An internal combustion engine kit according to claim 4, 5, 6, 7, or 8, wherein upon the activation of any or all of said temperature sensor, pressure sensor, oil pressure sensor, cover switch, or inertia switch, a power shut off of the cell power supply is directed by the electronic controller, to prevent the electrolysis cells from performing electrolysis.

* * * * *